United States Patent
Dongare et al.

(10) Patent No.: US 8,559,439 B1
(45) Date of Patent: Oct. 15, 2013

(54) METHOD AND APPARATUS FOR QUEUE ORDERING IN A MULTI-ENGINE PROCESSING SYSTEM

(75) Inventors: Anil B. Dongare, Bangalore (IN); Kuan Hua Tan, Coquitlam (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 158 days.

(21) Appl. No.: 13/288,437

(22) Filed: Nov. 3, 2011

Related U.S. Application Data (60) Provisional application No. 61/409,860, filed on Nov. 3, 2010.

(51) Int. Cl.
*H04L 12/28* (2006.01)

(52) U.S. Cl.
USPC ............ 370/394; 370/474; 370/417; 370/413

(58) Field of Classification Search
USPC .......................................... 712/28
See application file for complete search history.

(56) References Cited

U.S. PATENT DOCUMENTS

| | | | |
|---|---|---|---|
| 5,680,571 A * | 10/1997 | Bauman | 711/122 |
| 6,246,684 B1 | 6/2001 | Chapman | |
| 6,738,379 B1 | 5/2004 | Balazinski et al. | |
| 6,862,282 B1 * | 3/2005 | Oden | 370/394 |
| 7,047,395 B2 | 5/2006 | Rosner et al. | |
| 7,072,342 B1 | 7/2006 | Elnathan | |
| 7,477,644 B2 | 1/2009 | Georgiou et al. | |
| 7,668,187 B2 | 2/2010 | Shaikli | |
| 2008/0317059 A1 * | 12/2008 | Seigneurbieux | 370/417 |

* cited by examiner

*Primary Examiner* — Duc C Ho
(74) *Attorney, Agent, or Firm* — Dennis R. Haszko (57) ABSTRACT

A method and apparatus for queue-ordering commands in multi-engines, multi-queues and/or multi-flows environment is provided. Commands from single/multiple queues and multi-flows are processed by multi-engines with different processing time and/or out of order, which breaks sequential order of commands from same input queue and commands are distributed across multiple engines' output buffer after processing. Processed commands are stored in dedicated command output buffer associated with each engine temporarily. The processed commands are re-ordered while writing out. Also commands can be scheduled to idle engines to achieve maximum throughput, thus utilizing the engines in an optimal manner.

20 Claims, 7 Drawing Sheets

METHOD AND APPARATUS FOR QUEUE ORDERING IN A MULTI-ENGINE PROCESSING SYSTEM

CROSS REFERENCE TO RELATED APPLICATIONS

This application claims the benefit of U.S. Ser. No. 61/409,860, filed on Nov. 3, 2010, the contents which are incorporated herein by reference in their entirety.

FIELD

The present disclosure relates generally to multi-engine processing environments. More particularly, the present disclosure relates to queue ordering in a multi-engine processing system.

BACKGROUND

Multiple engines or processors are used to increase the throughput of a device or a network system. Typically, segments of one or more input streams are parallel processed in multiple processors to increase the processing efficiency or throughput of the system. However, out of order processing of the individual segments may result in a loss of order in the sequence of the segments within the input stream and the resulting output stream may not correspond to the input stream. Additional processing is then required to restore the order of the segments of the output stream relative to the input stream resulting in a compromise of the efficiencies gained by multi-processing.

SUMMARY

In a first aspect, the present disclosure provides a method for queue ordering in a multi-engine processing system having a plurality of processing engines to process a plurality of input streams and to provide a corresponding plurality of output streams. The method comprises: receiving the plurality of input streams, each input stream having a plurality of input segments, the plurality of input segments ordered relative to other input segments within the input stream; appending an identity tag to the plurality of input segments in each input stream to produce a plurality of tagged input segments, the identity tag including information indicating the input stream and the relative order within the input stream of each of the plurality of input segments; iteratively assigning each of the plurality of tagged input segments to any one of the plurality of processing engines based on availability of the processing engines in the relative order of the tagged input segments within the respective input stream; processing each of the plurality of tagged input segments in its respective assigned processing engine to produce a corresponding plurality of tagged output segments; storing each of the plurality of tagged output segments in a dedicated output buffer associated with its respective assigned processing engine; and, reordering the plurality of tagged output segments to produce the plurality of output streams, each output stream having the same relative order as in the corresponding input stream.

In another aspect, the present disclosure provides a multi-engine processing system comprising: an input queue handler configured to receive a plurality of input streams, each input stream having a plurality of input segments, the plurality of input segments ordered relative to other input segments within the input stream; a tagging module configured to append an identity tag to a plurality of input segments in each input stream to produce a plurality of tagged input segments, the identity tag including information indicating the input stream and the relative order within the input stream of each of the plurality of input segments; a scheduler configured to iteratively assign each of the plurality of tagged input segments to any one of a plurality of processing engines based on availability of the processing engines in the relative order of the tagged input segments within the respective input stream, each of the plurality of tagged input segments being processed in its respective assigned processing engine to produce a corresponding plurality of tagged output segments; a plurality of dedicated output buffers associated with the plurality of processing engines, the plurality of dedicated output buffers configured to store each of the plurality of tagged output segments; and, a reordering module configured to reorder the plurality of tagged output segments to produce a plurality of output streams, each output stream having the same relative order of output segments as in the corresponding input stream.

In another aspect, the present disclosure provides a non-transitory computer program product having a computer readable program code tangibly embodied therein which, when executed, causes a processor to perform the method for queue ordering in a multi-engine processing system having a plurality of processing engines to process a plurality of input streams and to provide a corresponding plurality of output streams.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Several methods have been proposed to reorder output streams resulting from out-of-order multi-processing. U.S. Pat. No. 7,072,342 describes a system and method of reordering out-of-order packets. In this method, while packets may be processed out of order, the processed packets or commands are written into command FIFO buffers of a command queue only when a current sequence number of the command FIFO buffer matches the packet sequence number of the processed packet. Thus, command FIFO buffer holds ordered commands when read out on a FIFO basis. When there are multiple command buffers, each processed command is associated with a lane number and a sequence number and each command FIFO buffer is dedicated to each input lane. Processed commands are written to a particular command FIFO buffer only when its lane number and sequence number matches with lane and sequence number of the processed command. Consequently, a task has to wait until the sequence number of the command matches the sequence number of the command FIFO buffer, and in effect, one or more tasks remain idle. In addition, the number of command FIFO buffers should be equal to number of input command lanes rendering the system inflexible and rigid.

U.S. Pat. No. 7,477,644 describes a method and system for packet reordering. The method detects breaks in sequences for one or more packet flows by detecting out-of-sequence packets and enters the segment of sequential packets into a separate memory area, such as linked list, for a particular flow. A transmission queue and reorder table is used to record the beginning sequence number for each segment. The transmission queue is consulted to locate the segment beginning with the lowest packet sequence number for a flow. The packets associated with the segment are transmitted in order. The transmission queue is repeatedly searched for the next lowest sequence number for transmission of associated packet chain until the transmission queue is emptied.

U.S. Pat. No. 7,668,187 describes a method and apparatus for reordering sequenced packets. An expiration time is calculated for each received data packet. The expiration time and a packet sequence number are stored in a table. The table is read to determine the next data packet to be transmitted in sequence number order. The next data packet is output if available. If the next data packet is not available, a true expiration time is determined for the unavailable next data packet. If the unavailable next data packet fails to arrive before the thru expiration time of the unavailable data packet, the unavailable next data packet is considered lost. The system may then transmit the packet stream with the unavailable packet omitted or request retransmission of the lost packet, resulting in an incomplete reordering or delayed transmission.

U.S. Pat. No. 6,246,684 describes a method and apparatus for re-ordering data packets in a network environment. The data packets or data traffic units, such as such as IP data packets, that may have been miss-ordered during a transmission over a multi-pathway link between a source node and a destination node in a network are re-ordered by intercepting the IP data packets and holding the IP data packets to allow IP data packets delayed on slower pathways to catch-up. The IP data packets in the storage medium are re-ordered based on their sequence number in an attempt to restore the original order of the IP data packets. The system may then transmit the IP data packets with the unavailable IP data packets omitted or request retransmission of the delayed or lost packets, resulting in an incomplete reordering or delayed transmission.

U.S. Pat. No. 6,738,379 describes a method of preserving data packet sequencing in a telecommunications network using User Datagram Protocol/Internet Protocol (UDP/IP) to communicate between nodes on the network. In this method, sequencing numbers are added to the headers of a plurality of data packets which are transmitted over a plurality of data transmission paths. The UDP/IP protocol is adapted with a re-sequencing layer which is utilized at the receiving node to re-sequence the packets. When a first data packet is received out of sequence at the receiving node, it is time-stamped and placed in a reconstruction buffer, and a packet timer, T1, is started. The packet timer T1 times the longest permissible transfer time of a single packet through the network. Subsequently received data packets are also stored in the buffer. If a received packet forms a sequence at the beginning of the buffer, the sequence is passed to the receiving application. If there are any other out-of-sequence packets left in the buffer, T1 is restarted with a T1 value equal to the T1 default value minus the total time spent by the next out-of-sequence packet in the reconstruction buffer. If there are no more out-of-sequence packets in the reconstruction buffer, then T1 is stopped. If T1 expires, or the buffer fills up, the first sequence of packets in the buffer are passed to the receiving application, regardless of their position in the buffer. This process is repeated until there are no more out-of-sequence packets in the reconstruction buffer.

U.S. Pat. No. 7,047,395 describes a method of serial data in a system with parallel processing flows. A distributed system is provided for apportioning an instruction stream into multiple segments for processing in multiple parallel processing units, and for merging the processed segments into a single processed instruction stream having the same sequential relative order as the original instruction stream. Tags are attached to each segment to indicate the order in which the various segments are to be merged and to indicate the engine number to which the next sequential segment is directed. After start up, the monitoring control unit at output side starts monitoring default engine for the first processed segment. The tag received with the processed segment indicates the next engine to be monitored for the next sequential segment, thus achieving reordering at output side. Consequently, only one flow can be active at a time and intermixed flows cannot be supported. For example, if two sequential segments from an instruction stream are provided to two engines in parallel and if the engine processing the subsequent sequential segment completes the processing prior to the engine processing the earlier sequential segment, the engine processing the subsequent segment cannot write out the subsequent processed segment and has to remain idle until the earlier segment is processed. Thus, an engine may remain idle for considerable periods of time and the system may not fully benefit from parallel processing. In addition, a priori knowledge of the engine in which a segment will be processed is required in order to properly tag the segments. This further limits the parallel processing capabilities of the system.

Generally, the present disclosure provides a method and apparatus for queue ordering in a multi-processing system. The method and apparatus can be implemented in multi-engine, multi-queue, and/or multi-flow environments, such as in multi-engine processor systems or in a network domain.

In a multi-engine processor or a multi-threading system, tasks from same program can be executed concomitantly on different processors to achieve maximum throughput. However, the completed task has to be provided in the order it was posted to the multi-processor system. The method and apparatus of the present disclosure provide for reordering completed tasks efficiently.

In a network domain, packets from an initiator or source may traverse through different network paths/nodes and reach the destination in out of order. The out-of-order packets need to be reordered at the destination. The method and apparatus of the present disclosure provide for reordering the out-of-order packets efficiently.

In the following description, the method are apparatus of the present disclosure are discussed in detail with respect to multiple command streams or queues in a multi-processing environment. It is understood that the method and apparatus of the present disclosure are equally applicable to multiple packet streams in a network domain. The individual commands (packets or frames) within a command (packet) queue or stream is referred to as a segment.

Figure 1:
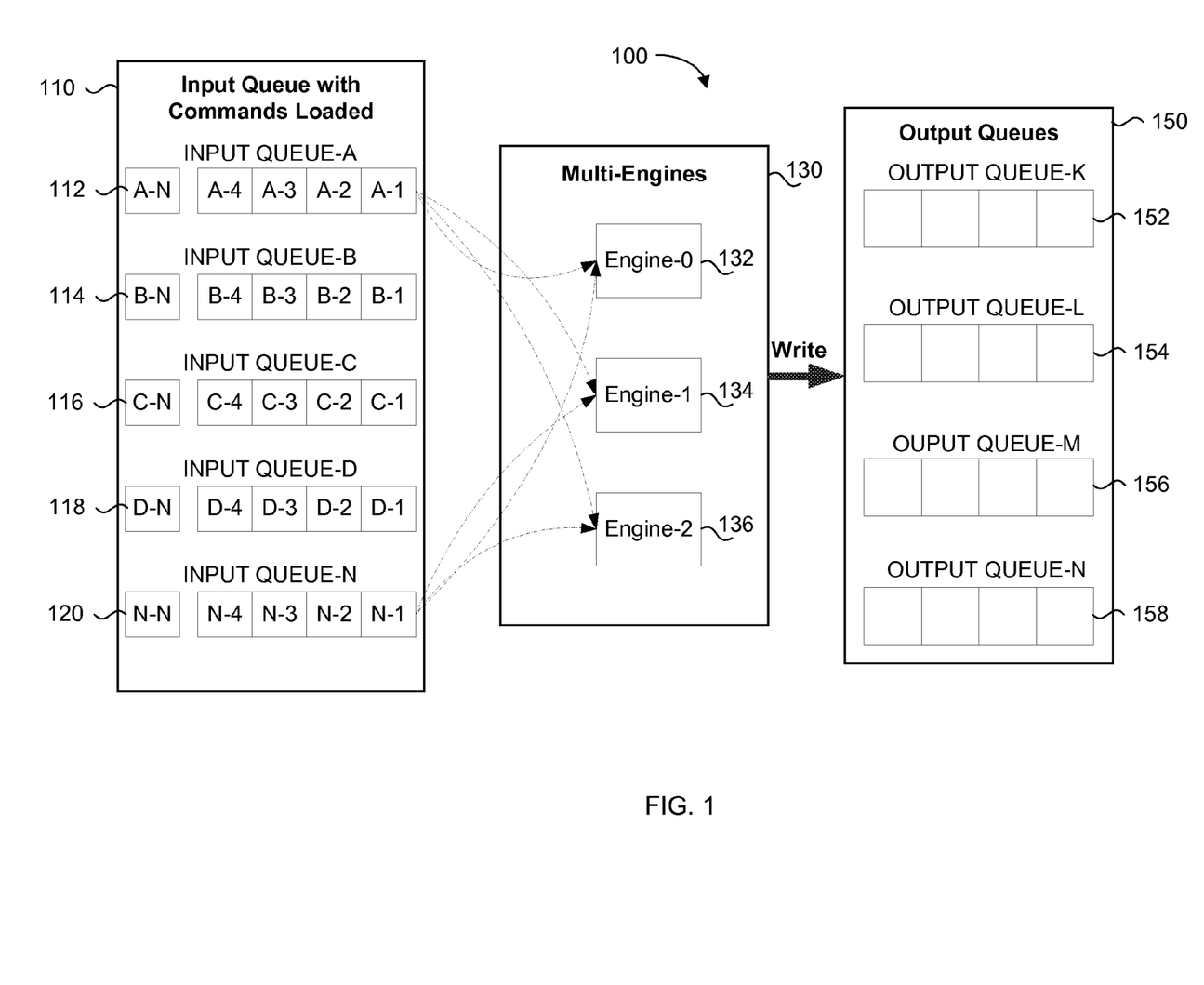
FIG. 1 is a schematic representation of a multi-engine processing system.

FIG. 1 illustrates a multi-engine processing system 100 capable of handling a plurality of input queues or input streams 110. The input queues are sequentially ordered commands or segments to be processed by the plurality of engines 130. The processed commands are written out to the plurality of output queues 150. In the example shown in FIG. 1, the plurality of input queues are received and stored in input queue buffer-A 112, input queue buffer-B 114, input queue buffer-C 116, input queue buffer-D 118, and input queue buffer-N 120. The plurality of processing engines 130 includes Engine-0 132, Engine-1 134, and Engine-2 136. The plurality of output queues 150 are written out and stored in output queue buffer-K 152, output queue buffer-L 154, output queue buffer-M 156, and output queue buffer-N 158. Thus, command streams A, B, C, D through N can be received and stored in the respective input queue buffers and the processed commands can be written out and stored in output queue buffers.

As shown in FIG. 1, the input queue buffer-A 112 has commands A-1, A-2, . . . A-N, input queue buffer-B 114 has commands B-1, B-2, . . . B-N, input queue buffer-C 116 has commands C-1, C-2, . . . C-N, input queue buffer-D 118 has commands D-1, D-2, . . . D-N, and input queue buffer-N 120 has commands N-1, N-2, . . . N-N.

It is noted that, for the purposes of the present disclosure, commands within a command input queue are related only in their sequence and are otherwise independent of other commands in the command input queue. Hence, the commands within a particular command input queue can be processed independent of each other. Also, the various command input queues are themselves independent of each other. Furthermore, the command input queues may be buffered in one or more input queue buffer and one input queue buffer may hold commands from more than one command input queue. For a discussion of inter-related commands within a command input queue and inter-related command input queues, reference is made to co-pending US Patent Application entitled Method and Apparatus for a Multi-Engine Descriptor Controller.

Commands within command input queue are appended with identity tags to indicate the command input queue to which the command belongs and to indicate the relative position or order of the command within the command input queue. For example, in FIG. 1, command A-2 refers to the second command in command input queue A, while command C-N refers to the Nth command in command input queue C. Depending on system requirements, the identity tags for each command may be appended while receiving and storing the individual commands in the input queue buffer. Alternatively, the identity tags may be appended prior to assigning the commands for processing.

Commands from the input queues can be read out in a round-robin manner or in a random manner depending on the availability of commands in the input queues. All commands from one input queue may be read out at a time or multiple commands from an input queue may be read out depending on the availability of commands in the input queues. The readout of commands from an input queue may also be based on a priority level of the input queues.

Commands read out from the input queues can be directly scheduled or assigned to any one of the plurality of the engines for processing based on the availability of the processing engine. In other example embodiments, read out commands can be stored in a shared buffer for pre-processing or filtering before scheduling it to a free engine for processing. When commands are stored in shared buffer, they can be provided to an idle engine immediately without fetching.

In the example shown in FIG. 1, any one of Engine-0 132, Engine-1 134, or Engine-2 136 is capable of processing the commands read out from the input queues. In an example embodiment, all engines may be identical in architecture and functionality or, in other example embodiments, each engine may differ in functionality and/or architecture, but capable of processing any command assigned to it. Commands from same input queue can be processed on multiple engines depending on availability of the engines at any given instance in order to use the engines optimally. The commands from different input queues may be interleaved and assigned (or scheduled) to an available engine provided the relative order of the commands within the respective command input queue is maintained. For example, Engine-0 can process commands B-1, C-2, B-3, and C-3, as shown in FIG. 2, provided commands C-1 and B-2 have been assigned for processing by other engines prior to scheduling commands C-2 and B-3 for processing by Engine-0.

Once processed, the processed commands can be written to output queues with a single write channel or multiple write channels. In certain example embodiments, an input queue may also act as an output queue. The processed command may be buffered in one or more output queue buffers and one output queue buffer may hold processed commands from more than one command output queue.

Figure 2:
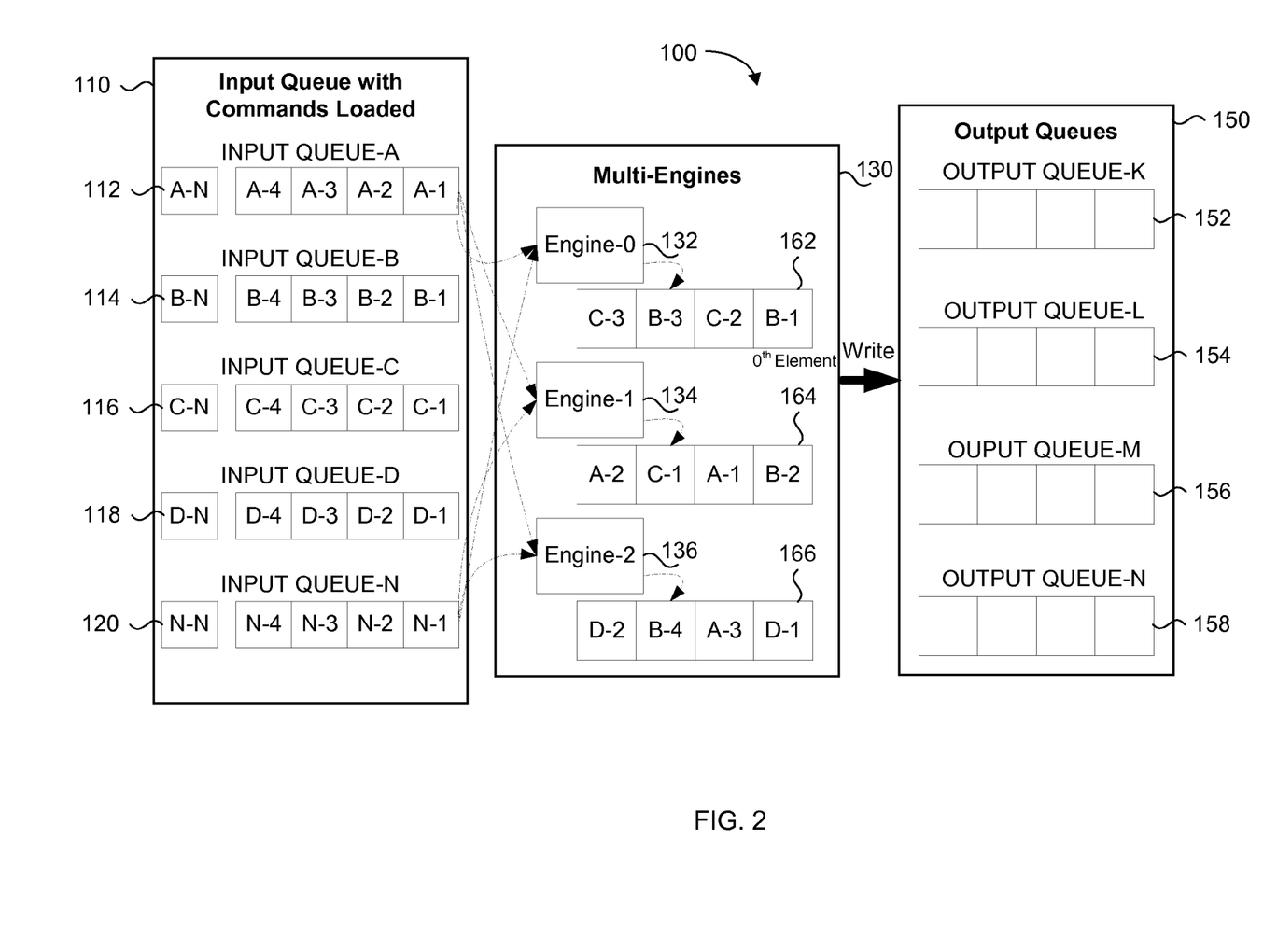
FIG. 2 is a schematic representation of command processing in the multi-engine processing system of FIG. 1.

In the example embodiment shown in FIG. 2, the three engines are identical and are capable of processing any command assigned to them. However, depending on the nature of a command being processed, for example, the byte count and functionality of the command, a command provided earlier to one engine may take more time to process than another command assigned to other engine. Thus, processed commands would be ready to write out at different time points. Also, the sequence of commands from the same input queue would be disturbed at the output side and may be distributed across the dedicated buffers of the respective engines. As shown in FIG. 2, each engine has a dedicated output buffer. For example, Engine-0 132 has a dedicated output buffer 162, Engine-1 134 has a dedicated output buffer 164, and Engine-2 136 has a dedicated output buffer 166.

As described earlier, in instances where commands within a command input queue are inter-dependent, these commands can be processed sequentially to the same engine to preserve processing dependency. For a discussion of inter-related commands within a command input queue and inter-related command input queues, reference is made to co-pending US Patent Application entitled Method and Apparatus for a Multi-Engine Descriptor Controller.

For the purposes of the present disclosure, commands from a command input queue can be processed independent of each other. Also, the various command input queues are themselves independent of each other. Thus, commands from one command input queue can be assigned to be processed out of order to the same processing engine, provided the relative order of the commands within the respective command input queue is maintained. Thus, Engine-1 134 can be assigned commands A-1 and A-2 from the command input queue A, provided A-1 is assigned to be processed prior to A-2. In addition, as discussed earlier, engines may take variable times to process commands depending on the byte count and functionality described in a command. In the example embodiment of FIG. 2, command B-1 assigned to Engine-0 132 required longer processing time while command B-2 assigned to Engine-1 134 was processed earlier. Thus, command A-1 from command input queue A and command C-1 from command input queue C were scheduled to be processed by Engine-1 134 and command C-2 was assigned to be processed by Engine-0 132 once processing of command B-1 was completed.

The scheduling of commands from various command input queues shown in the example embodiment of FIG. 2 with respect to each engine will now be described. Engine-0 132 was assigned and has processed commands from command input queues B and C. Commands B-1 and B-3 belong to command input queue B and commands C-2 and C-3 belong to command input queue C. Engine-0 132 has processed these commands from different command input queues with sequence order: B-1, C-2, B-3, C-3 respectively and has stored the processed commands in its dedicated output buffer 162.

Engine-1 134 was assigned and has processed commands from command input queues A, B and C. Commands A-1 and A-2 belong to command input queue A, command B-2 belongs to command input queue B, and command C-1 belongs to command input queue C. Engine-1 134 has processed these commands from different command input queues with sequence order: B-2, A-1, C-1, A-2 respectively and has stored the processed commands in its dedicated output buffer 164.

Engine-2 136 was assigned and has processed commands from command input queues A, B and D. Command A-3 belongs to command input queue A, command B-4 belongs to command input queue B, and commands D-1 and D-2 belong to command input queue D. Engine-2 136 has processed these commands from different command input queues with sequence order: D-1, A-3, B-4, D-2 respectively and stored the processed commands in its dedicated output buffer 166.

It is clear from the example embodiment of FIG. 2 that commands from the same command input queue can be processed by multiple engines and distributed across different command output buffers dedicated to each engine. A method of reordering the commands out-of-order processed will now be discussed with reference to FIGS. 3 and 4.

Figure 3:
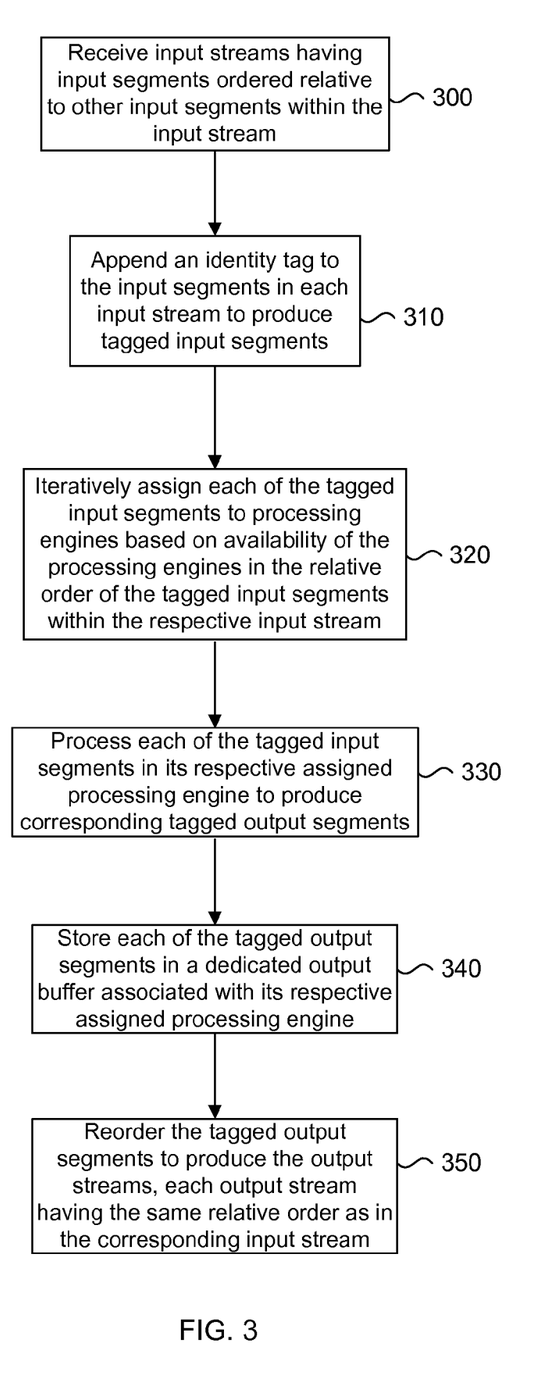
FIG. 3 is a flowchart of a method of queue ordering in a multi-engine processing system in accordance with this disclosure.

FIG. 3 is a flowchart of a method of queue ordering in a multi-engine processing system in accordance with this disclosure. At 300, the plurality of input streams are received. As described earlier, each input stream has a plurality of input segments and the plurality of input segments are ordered relative to other input segments within the input stream. At 310, an identity tag is appended to the plurality of input segments in each input stream to produce a plurality of tagged input segments. The identity tag includes information indicating the input stream and the relative order within the input stream of each of the plurality of input segments. At 320, each of the plurality of tagged input segments is iteratively assigned to any one of the plurality of processing engines based on availability of the processing engines and in the relative order of the tagged input segments within the respective input stream. At 330, each of the plurality of tagged input segments is processed in its respective assigned processing engine to produce a corresponding plurality of tagged output segments. At 340, each of the plurality of tagged output segments is stored in a dedicated output buffer associated with its respective assigned processing engine. At 350, the plurality of tagged output segments are reordered to produce the plurality of output streams. Thus, each output stream has the same relative order of output segments as in the corresponding input stream.

In an example embodiment, reordering the plurality of tagged output segments to produce the plurality of output streams comprises repeatedly scanning the dedicated output buffers to identify tagged output segments according to their relative order within each input stream to generate the plurality of output streams.

In an example embodiment, the method further comprises storing, in a temporary write out buffer, each tagged output as it is identified; and writing out the output stream having the same relative order of output segments as in the corresponding input stream.

In an example embodiment, the method further comprises severing the appended identity tag from the tagged output segments prior to writing out the output stream having the same relative order of output segments as in the corresponding input stream.

In an example embodiment, processing each of the plurality of tagged input segments in its respective assigned processing engine to produce the corresponding plurality of tagged output segments comprises maintaining the information included in the identity tag appended to each of the plurality of tagged input segments during processing by the assigned processing engine.

In an example embodiment, the method further comprises storing the received plurality of input streams in input buffers prior to iteratively assigning each of the plurality of tagged input segments to any one of the plurality of processing engines.

In an example embodiment, appending an identity tag to the plurality of input segments may be performed prior to storing the plurality of input streams in the input buffers. In another example embodiment, appending an identity tag to the plurality of input segments may be performed after storing the plurality of input streams in the input buffers and prior to iteratively assigning each of the plurality of tagged input segments to any one of the plurality of processing engines.

In an example embodiment, iteratively assigning each of the plurality of tagged input segments to any one of the plurality of processing engines comprises assigning the tagged input segments within one of the plurality of input streams to the same one of the plurality of processing engines to maintain processing dependency of the tagged input segments within the respective input stream.

In an example embodiment, the method further comprises storing the plurality of tagged input segments in a shared buffer for pre-processing or filtering prior to assigning each of the plurality of tagged input segments to any one of the plurality of processing engines.

In an example embodiment, iteratively assigning each of the plurality of tagged input segments to any one of the plurality of processing engines may be on any one of a round-robin order, a random order, an arbitrated order, and a priority order.

Figure 4:
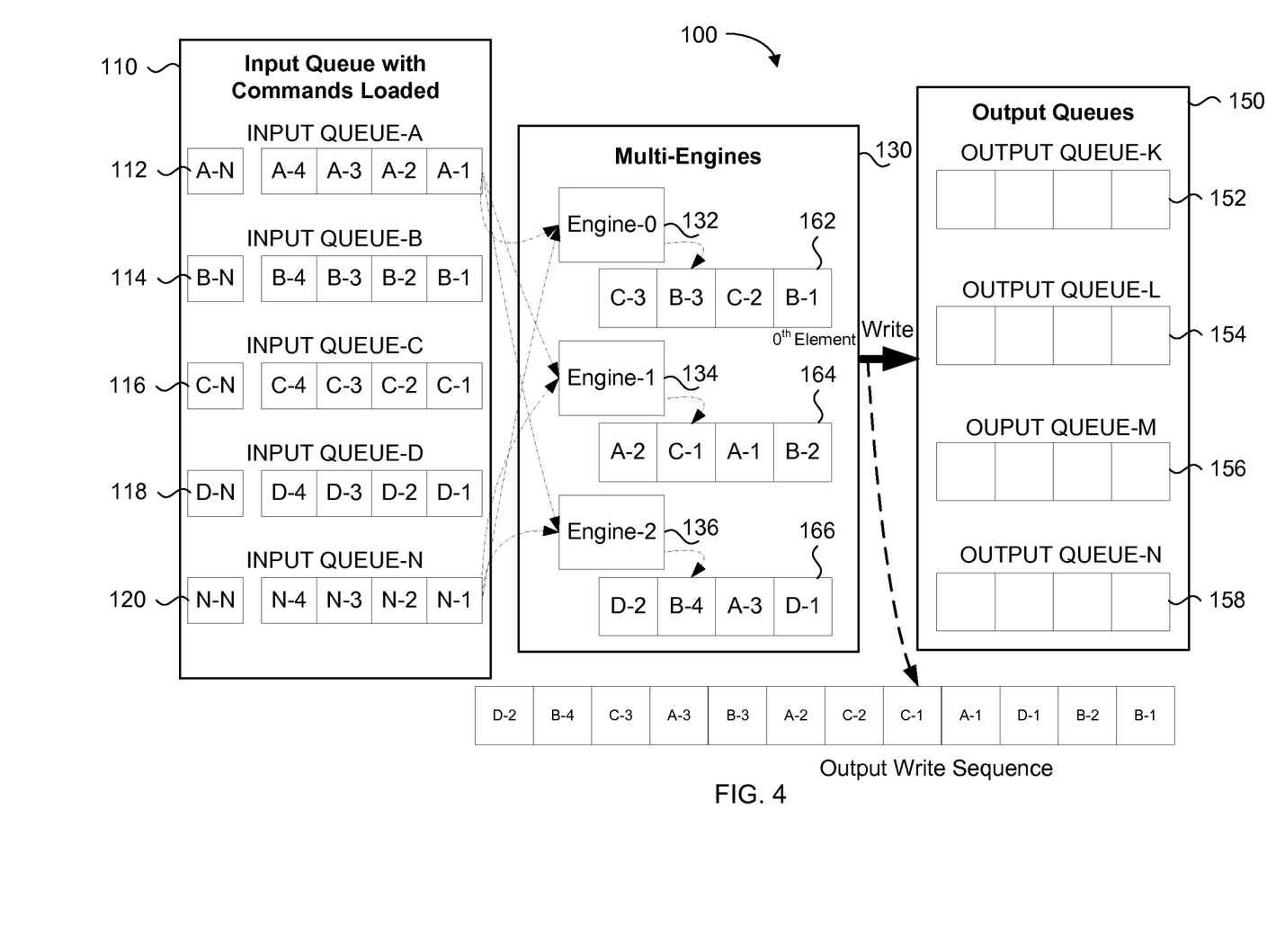
FIG. 4 is a schematic representation of writing out of processed commands in the multi-engine processing system of FIG. 1.

FIG. 4 illustrates the required queue ordering while writing out the processed commands to the output queues, each output queue having the same relative sequence as in the corresponding input queue. As described earlier, the plurality of output queues 150 are written out and stored in output queue buffer-K 152, output queue buffer-L 154, output queue buffer-M 156, and output queue buffer-N 158. The various command input queues A-N are iteratively scheduled or assigned to be processed on any one of the plurality of processing engines based on the availability of the processing engines in the relative order if the commands within their respective command input queue as discussed earlier with respect to the example embodiment of FIG. 2.

The processed commands are stored in the dedicated output buffer associated with its respective assigned processing engines and may be in any order relative to other processed commands within its command input queue and also may be interleaved with processed commands from other command input queues. For example, the dedicated output buffer 166 associated with Engine-2 136 has processed commands D-1, A-3, B-4 and D-2 from commands input queues D, A and B.

In order to maintain the original order or sequence of the commands within a given command input queue, the processed commands must be written out to the command output queues in the same sequence as it was read out from the respective command input queue. It follows that A-1 should be written before A-2, A-2 should be written before A-3 and so on. As shown in FIG. 4, commands are written in the same relative order as in the command input queue: B-1, B-2, D-1, A-1, C-1, C-2, A-2, B-3, A-3, C-3, B-4, and D-2, i.e., the relative order of commands within a command output queue is maintained in the write out sequence irrespective of the processing engine that processed each command.

In the example embodiment of FIG. 4, processed commands from command input queue A are written out as: A-1, A-2 and A-3, wherein commands A-1 and A-2 commands were processed by Engine-1 and command A-3 was processed by Engine-2. In the example embodiment, command A-3 was processed earlier to command A-2 but it was not written out since command A-2 was not processed. Processed command A-3 was stored in the dedicated output buffer 166 of Engine-2 136 until command A-2 was processed and ready for write out.

Similarly, processed commands from command input queue B are written out as: B-1, B-2, B-3 and B-4, wherein commands B-1 and B-3 were processed by Engine-0, command B-2 was processed by Engine-1 and command B4 was processed by Engine-2. In the example embodiment commands B-1 and B-2 were processed at the same time by different engines and hence could be written out sequentially. However, command B-4 was processed earlier by Engine-2 but it was not written out as command B-3 was not processed. Processed command B-4 was stored in dedicated output buffer 166 of Engine-2 136 until command B-3 was processed and ready for write out. Processed commands from command input queue C are written as: C-1, C-2, C-3; wherein command C-1 was processed by Engine-1, commands C-2 and C-3 were processed by Engine-0. In the example embodiment command C-2 was processed earlier than command C-1, but it was not written out until the processing of command C-1 was completed. Processed command C-2 was stored in dedicated output buffer 162 of Engine-0 136 until command C-1 was processed and ready for write out. Processed commands from command input queue D are written as: D-1, D-2; wherein commands D-1 and D-2 were processed by same engine sequentially and hence could be written out in that order without any waiting period.

An example embodiment of a system and an apparatus to re-order commands processed in a multi-engine system will now be described with reference to FIGS. 5 and 6. The apparatus relieves the burden of re-ordering the processed commands as they are written out to the command output queues in the same relative order in the corresponding input queue. In addition, the apparatus schedules commands out of order to utilize the engines optimally.

In an aspect, the present disclosure provides a multi-engine processing system comprising: an input queue handler configured to receive a plurality of input streams, each input stream having a plurality of input segments, the plurality of input segments ordered relative to other input segments within the input stream; a tagging module configured to append an identity tag to a plurality of input segments in each input stream to produce a plurality of tagged input segments, the identity tag including information indicating the input stream and the relative order within the input stream of each of the plurality of input segments; a scheduler configured to iteratively assign each of the plurality of tagged input segments to any one of a plurality of processing engines based on availability of the processing engines in the relative order of the tagged input segments within the respective input stream, each of the plurality of tagged input segments being processed in its respective assigned processing engine to produce a corresponding plurality of tagged output segments; a plurality of dedicated output buffers associated with the plurality of processing engines, the plurality of dedicated output buffers configured to store each of the plurality of tagged output segments; and, a reordering module configured to reorder the plurality of tagged output segments to produce a plurality of output streams, each output stream having the same relative order of output segments as in the corresponding input stream.

In an example embodiment, the reordering module comprises a sequencer controller configured to repeatedly scan the plurality of dedicated output buffers to identify tagged output segments according to their relative order within each input stream to generate the plurality of output streams.

In an example embodiment, the sequencer controller includes a plurality of sequencers each associated with a dedicated output buffer.

In an example embodiment, the multi-engine processing system further comprises a temporary write out buffer for storing each tagged output as it is identified; and multiplexer configured to write out the output stream having the same relative order of output segments as in the corresponding input stream.

In an example embodiment, the tagging module is further configured to sever the appended identity tag from the tagged output segments prior to writing out the output stream having the same relative order of output segments as in the corresponding input stream.

In an example embodiment, the sequence controller includes a plurality of sequence number counters associated with each of the plurality of input streams.

In an example embodiment, the input queue handler comprises input buffers for storing the received plurality of input streams prior to iteratively assigning each of the plurality of tagged input segments to any one of the plurality of processing engines.

In an example embodiment, the input queue handler comprises a shared buffer for storing the plurality of tagged input segments for pre-processing or filtering prior to assigning each of the plurality of tagged input segments to any one of the plurality of processing engines.

Figure 5:
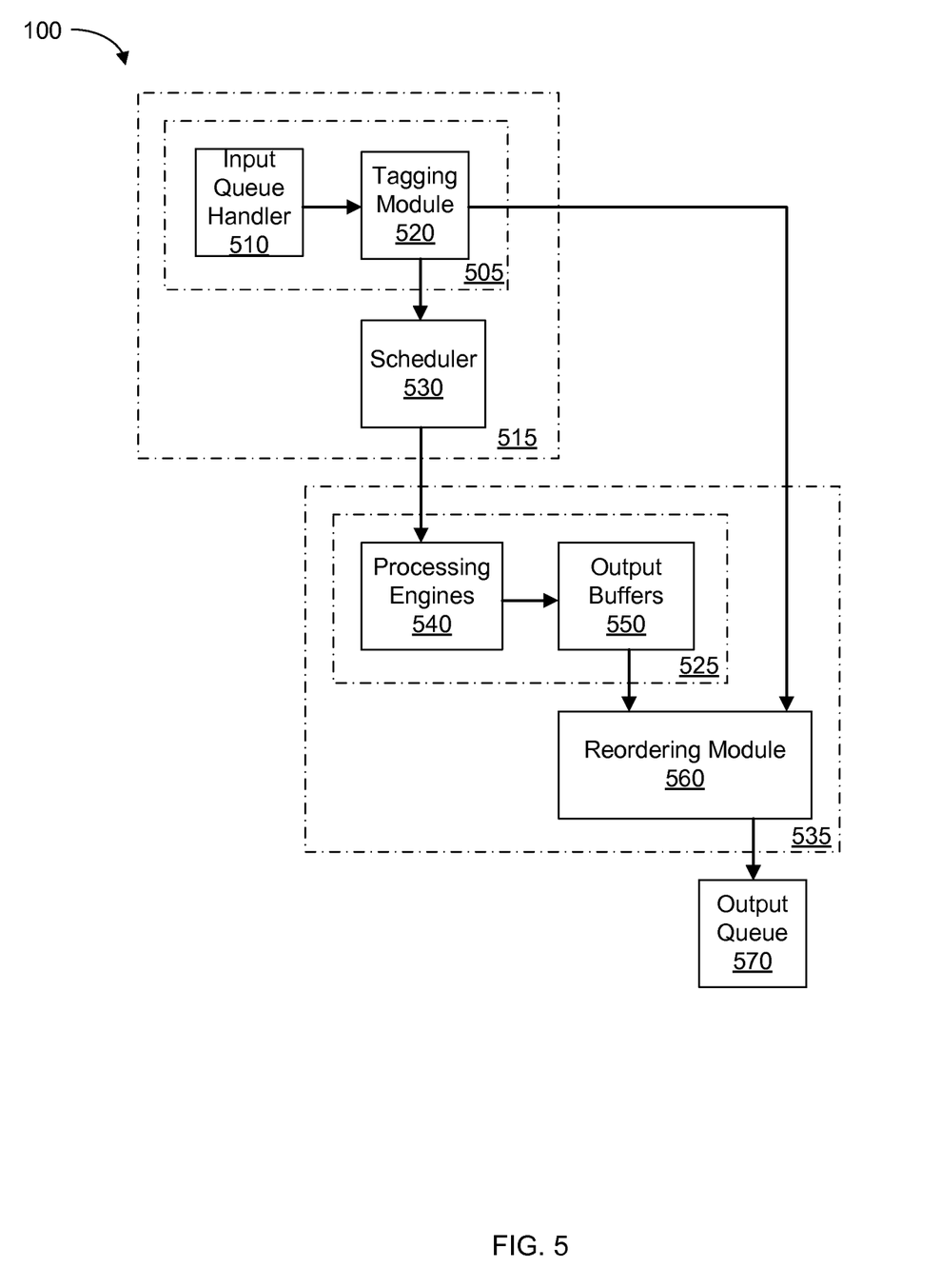
FIG. 5 is a schematic representation of a multi-engine processing system in accordance with this disclosure.

FIG. 5 is a schematic representation of a multi-engine processing system in accordance with this disclosure. The multi-engine processing system 100 comprises an input queue handler 510; a tagging module 520; a scheduler 530; a plurality of processing engines 540; a plurality of output buffers 550; a reordering module 560; and an output queue 570. The input queue handler 510 is configured to receive a plurality of input streams. Each input stream has a plurality of input segments and the plurality of input segments ordered relative to other input segments within the input stream. The tagging module 520 is configured to append an identity tag to a plurality of input segments in each input stream to produce a plurality of tagged input segments. The identity tag includes information indicating the input stream and the relative order within the input stream of each of the plurality of input segments. The scheduler 530 is configured to iteratively assign each of the plurality of tagged input segments to any one of a plurality of processing engines 540 based on availability of the processing engines 540 in the relative order of the tagged input segments within the respective input stream. Each of the plurality of tagged input segments is processed in its respective assigned processing engine 540 to produce a corresponding plurality of tagged output segments. Each of the plurality of processing engines 540 has a corresponding plurality of dedicated output buffers 550. The plurality of dedicated output buffers 550 are configured to store each of the plurality of tagged output segments. The reordering module 560 is configured to reorder the plurality of tagged output segments to produce a plurality of output queues or streams 570. Each output stream has the same relative order of output segments as in the corresponding input stream.

It is noted that the elements of the multi-engine processing system 100 may be implemented as a software routine, hardware circuit, firmware, or a combination thereof. Furthermore, one or more elements of the multi-engine processing system may be implemented as a single element. For example, the input queue handler 510 and the tagging module may be implemented as one element 505. The scheduler may be combined with the input queue handler 510 and the tagging module may be implemented as one element 515, which handles all the pre-processing steps. The plurality of processing engines 540 along with their respective dedicated output buffers 550 may be implemented as one element 525. The reordering module may be combined with the processing engines and their dedicated buffers an element 535. In some examples, the output queues 570 and input queues (not shown in FIG. 5) may be implemented as one element. Other combinations of elements are also possible.

Figure 6:
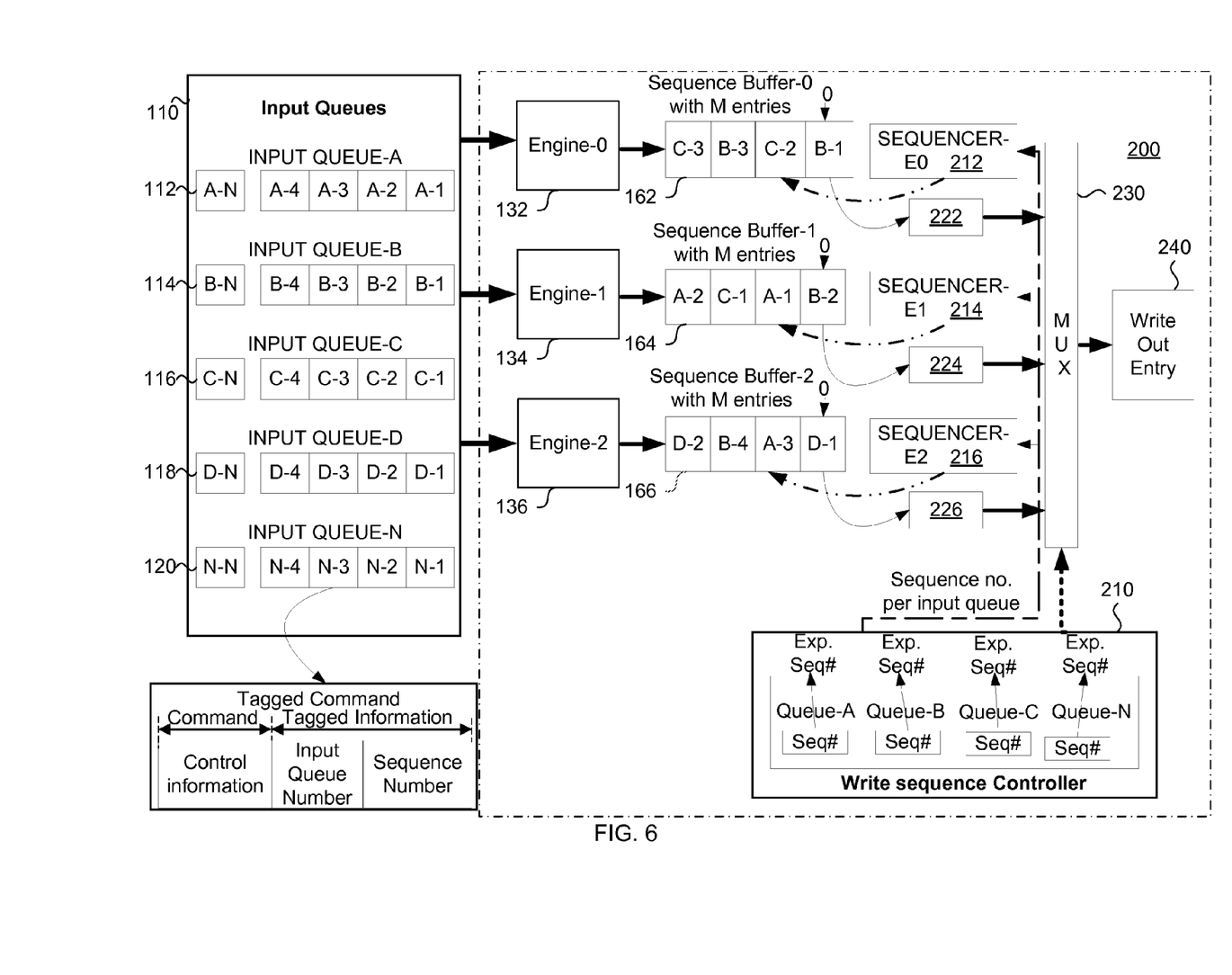
FIG. 6 is an example embodiment of an apparatus for queue ordering in a multi-engine processing system in accordance with this disclosure.

FIG. 6 illustrates an example embodiment of an apparatus 200 for queue ordering in a multi-engine processing environment. Commands in the various command input queues are tagged by appending unique information or identity tags indicating the command input queue identification number (queue number) and its position (sequence number) within the respective command input queue. The identity tags may be appended by tagging module 520 while posting commands in the input queues. In other embodiments, commands may be tagged by the tagging mechanism after reading it from input queues and prior to scheduling the commands for processing by the various engines.

Commands from command input queues are processed by an engine of the multi-engine processing system in any order resulting in out-of-order processed commands as described with respect to FIG. 4. Processed commands are stored in dedicated output command buffers of the respective engine that processed the command. Since commands from the same command input queue can be processed by multiple engines in an out-of-order sequence and due to the variable time taken by the engines to process assigned/scheduled commands, the processed commands may be distributed across multiple output buffers.

A sequence controller 210, that controls the tagging module 520 on the input side provides the sequence number for each command input queue to sequencers 212, 214, and 216 associated with dedicated output buffers 162, 164, and 166 of engines 132, 134, and 136 respectively. Each sequencer scans through its respective command output buffer to locate the expected processed command with matching queue number and sequence number (identity tag) provided by the sequence controller 210. Each sequencer selects the first matching entry to write out. The sequence controller 210 finally selects one entry out of the selected entries to write out thus achieving efficient queue ordering.

Each of the various components of the apparatus 200 are described in further detail below.

Tagging of Commands:

In an example embodiment, commands are tagged with input queue number and sequence number after reading commands from the command input queue. Sequence number indicates position or order of the command within a command input queue. This tagging information makes each command unique in the system at that time/moment. The queue number and the sequence number are utilized at the output side while queue ordering. Tagging information is preserved or maintained by the processing engines. The tagged information is used by sequencers at output side to select the entry for write out.

Command Output Buffer:

After processing of commands, each engine writes the processed commands in its dedicated command output buffer. Processed commands (along with their identity tags, also referred to as tagged output segments) are written to the command output buffer in the sequence they are processed by engines. The depth of the command output buffers can be chosen based on the bandwidth required by the system. The depth of a command output buffer refers to the number of processed commands or segments that can be stored in the command output buffer. By having a dedicated command buffer for each engine, each engine can directly access its command output buffer to write out processed commands without any waiting time. Furthermore, the engine can be freed to process the next command in the pipeline thereby increasing processing throughput. Thus, engine utilization can be optimized and engine idle times can be reduced. The processed commands in the command output buffers wait for write out until it is selected by the sequencer. Thus, processed commands from the command output buffers are read out in proper queue order without the requirement for additional sorting means.

A command output buffer full flag may be used to indicate when a dedicated command output buffer associated with an engine is full and further scheduling of input commands for processing to that engine may be controlled. If all command output buffers of all engines are full, commands in the schedule pipeline will need to wait for the command output buffers to write out already processed commands.

Sequencer:

Sequencers 212, 214, and 216 are dedicated to each command output buffers 162, 164, and 166, respectively. Each sequencer receives an input from the sequence controller 210 for matching expected processed command to write out. Sequence controller 210 provides expected sequence number per queue to the sequencers. The sequencers start scanning expected sequence numbers for each queue to each element in the respective command output buffer. Whenever a first processed command matches with the expected queue number and the sequence number, it is selected by the sequencer for write out. Selected entry is stored temporarily in write out buffers 222, 224, and 226 associated with each sequencer 212, 214, and 216 respectively and written out to write out entry 240 via a multiplexer 230. An advantage of having dedicated sequencer per engine is that command output buffers can be scanned concurrently to locate expected write out entry thereby reducing latency.

In an example embodiment, when there are sufficient dedicated write channels, a multiplexer may not be required. The selected entry from respective command output buffer can be written out directly.

In an example embodiment, when there are more write channels than the number of processing engines and their respective command output buffers, a write out scheduler may be used to efficiently write out the processed commands to the output queue/stream.

In an example embodiment, multiple entries from command output buffer can be matched with expected sequence numbers per queue. These multiple matched entries can be selected at a time for write out or can be buffered for write out.

After selecting write out entry from a command output buffer, the selected entry is moved to the associated write out buffer. In effect, a hole or a vacancy is created in the command output buffer. In an example embodiment, remaining entries in the command output buffer are sequentially shifted to fill up the vacancy, which creates additional room at the end of buffer. While shifting entries, writing to the command output buffer may not be permitted. In addition, a sequencer may not scan the command output buffer until its associated write out register becomes empty.

Command output buffers serve as intermediate storage for processed commands before write out. To maintain queue ordering, processed command need to be written out in sequence. If a processed command cannot be written out, for example, when an earlier command in the command input queue or sequence is still being processed by an engine, the processed command can be held in the command output buffer. Thus, reordering of commands is achieved even if commands from same command input queue are distributed across multiple output command buffers. Also, the need for maintaining reordering tables or linked lists is eliminated. Furthermore, in network domain applications, the need for maintaining any packet storage, memory table or linked pointers for subsequent packets is eliminated. In addition, expiration timers to detect packet loss are not required for reordering. The number of output command buffers depends on number of engines and does not depend on number of lanes or input queues providing flexibility and scalability in system design.

In example embodiments, the appended identity tags from the tagged output segments may be severed prior to writing out the output stream having the same relative order of output segments as in the corresponding input stream.

Sequence Controller:

Sequence controller 210 holds the sequence number counter for each input queue. In an example embodiment, at power on, all counters may be initialized to zeros. Based on the information from the tag producer on the input side, the sequence controller 210 can provide the expected sequence number for each queue to all the sequencers on the output side. Each sequencer scans its associated command output buffer elements and compares the identity tag of the processed commands with sequence numbers provided by sequence controller on a per queue basis. A matched entry would be selected by all sequencers to write out, so multiple entries would be available to write out at the same time. Sequence controller 210 monitors write out entries and is responsible to select one entry out of multiple entries depending on round robin, priority, or arbitration schemes.

In an example embodiment, multiple entries can be selected by the sequence controller and can be buffered for writing out.

After selecting one of the entries to write out, sequence number of respective queue is incremented by one and provided to sequencer for subsequent searches. After saturation of sequence number count (i.e., once all the commands in a queue have been processed and read out), it can be reset to zero. Sequence number saturation count can be dependent on design and assigned a value that is unique in the device at that moment.

In the above example embodiment, the sequencer and the sequence controller are separate entities. In other embodiments, the sequencer and the sequence controller can be a single entity having the same functionality described above.

Flow of Operation:

An example flow of operation is provided below.

1. After power on, sequence number for each queue will be 0, this sequence number will be provided as input to each sequencer.

2. Input queues are loaded with different commands, each command is tagged with sequence number and input queue number. Engines will process commands from input queue as and when an engine is available.

3. After processing of commands, each engine will write the processed command to its dedicated command output buffer on first come first resides basis.

4. Sequencer will be triggered to scan commands in command output buffer, sequence number of each input queue will be compared with each entry in the command output buffer.

5. First matching entry from command output buffer will be selected for write out by sequencer.

6. Write sequence controller selects final write out entry from selected entries by sequencers.

7. Command is ready to write out.

8. Input queue number is extracted from command and sequence number is incremented by 1 for respective input queue number.

Figure 7:
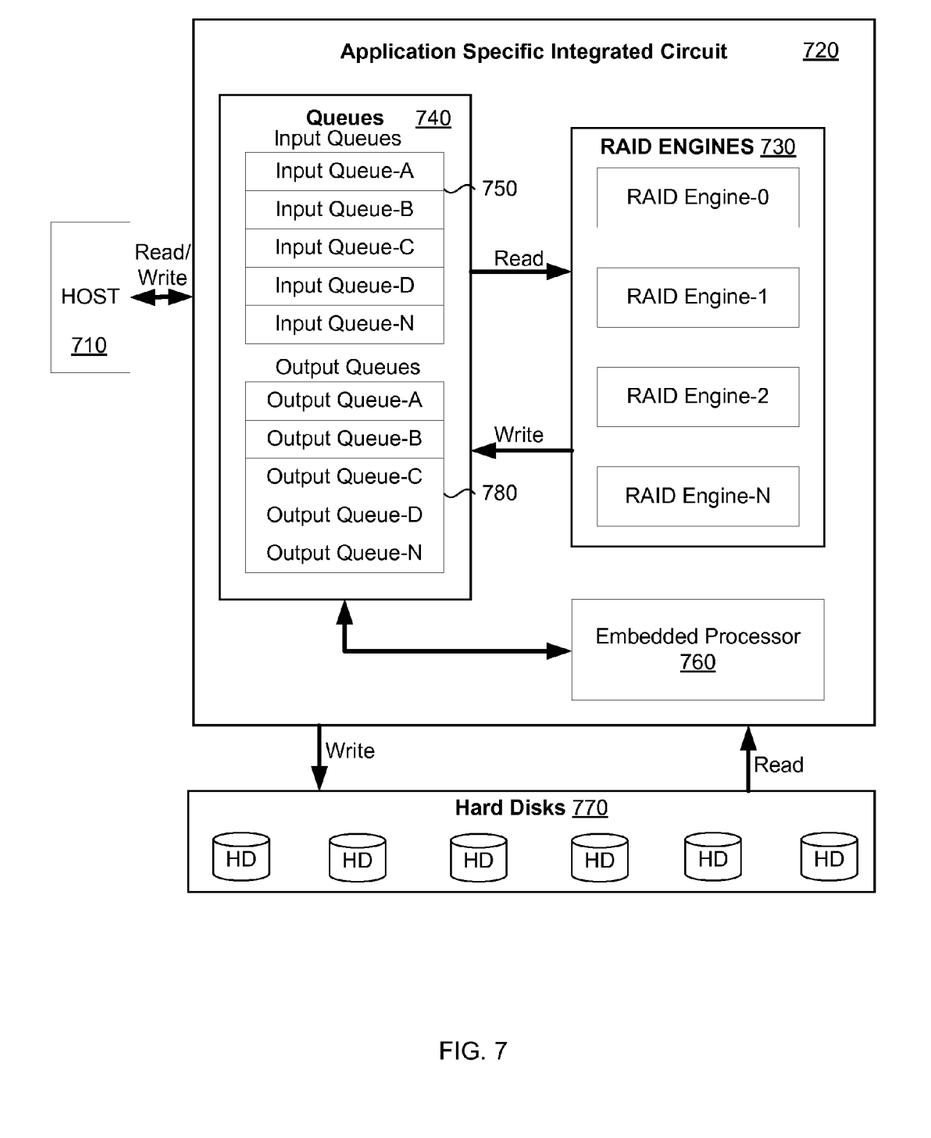
FIG. 7 is an illustration of an application of the apparatus of FIG. 5 in a multi-engine RAID system.

FIG. 7 provides an illustration of an application of the apparatus of FIG. 5 in a multi-engine processing system. In applications such as RAID controllers, the Host computer 710 is connected to a RAID ASIC 720 via a PCIe protocol bus. RAID controller ASIC 720 has multiple RAID engines 730 to process data and commands to meet required throughput. The Host 710 and RAID controller 720 communicate to each other by using a set of queues 740 on the RAID controller 720. The queues 740 in the controller are classified as input queues 750 from the Host, and output queues from the RAID engines 730. The Host 710 writes commands for the RAID controller into the input queues 750. The input queues 750 are read by the embedded processor 760 and commands are created for RAID engines 730 to process data. Newly generated commands are loaded to input queues 750 dedicated to RAID engines 730. RAID engines 730 reads commands from input queues 750 and after processing them (e.g., read/write operations from Hard Disks 770), writes the processed commands back to output queues 780. The embedded processor 760 monitors output queues 780 for completion of RAID commands in the same order as was loaded in input queues 750. After completing the Host command, the embedded processor 760 will signal the Host 710 that the command is complete by writing into the outbound queue 780. A write to the outbound queue can generate an interrupt to the Host 710.

In the above example embodiments, processed commands are stored in output command buffers dedicated to each engine and the engines are free to process the next pipelined command. Architecture of the example embodiments is such that, the processed commands read out from output command buffers maintain ordering for write out and no additional sorting effort required. Each output command buffer is scanned to locate matching entry with expected input queue and sequence number and if a match found, the respective entry is selected to write out. Thus, reordering of processed commands is achieved even if the commands from the same input queue are distributed across multiple output command buffers. The number of output command buffers depends on the number of engines and does not depend on number of lanes or input queues.

Commands from same or different input queues can be scheduled to different engines and if they are from different input queues, they can be written out independently maintaining reordering. Each engine has a dedicated output command buffer to store commands temporarily so that the engine can be free to process pipelined commands, thus increasing the throughput of the system. A sequencer is dedicated to each command output buffer so that multiple write out entries from multiple command output buffers are selected simultaneously which reduces latency to write out.

Thus, the present disclosure provides an efficient method and apparatus for queue ordering in a multi-engine processing system.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for queue ordering in a multi-engine processing system, the method comprising:
   receiving a plurality of input streams, each input stream having a plurality of input segments, the plurality of input segments ordered relative to other input segments within the input stream;
   appending an identity tag to the plurality of input segments in each input stream to produce a plurality of tagged input segments, the identity tag including information indicating the input stream and the relative order within the input stream of each of the plurality of input segments;
   iteratively assigning each of the plurality of tagged input segments to any one of a plurality of processing engines based on availability of the processing engines in the relative order of the tagged input segments within the respective input stream;
   processing each of the plurality of tagged input segments in its respective assigned processing engine to produce a corresponding plurality of tagged output segments;
   storing each of the plurality of tagged output segments in a dedicated output buffer associated with its respective assigned processing engine; and,
   reordering the plurality of tagged output segments to produce the plurality of output streams, each output stream having the same relative order of output segments as in the corresponding input stream.

2. The method of claim 1, wherein reordering the plurality of tagged output segments to produce the plurality of output streams comprises:
   repeatedly scanning the dedicated output buffers to identify tagged output segments according to their relative order within each input stream to generate the plurality of output streams.

3. The method of claim 2, further comprising:
   storing, in a temporary write out buffer, each tagged output as it is identified; and
   writing out the output stream having the same relative order of output segments as in the corresponding input stream.

4. The method of claim 3, further comprising:
   severing the appended identity tag from the tagged output segments prior to writing out the output stream having the same relative order of output segments as in the corresponding input stream.

5. The method of claim 1, wherein processing each of the plurality of tagged input segments in its respective assigned processing engine to produce the corresponding plurality of tagged output segments comprises:
   maintaining the information included in the identity tag appended to each of the plurality of tagged input segments during processing by the assigned processing engine.

6. The method of claim 1, further comprising:
   storing the received plurality of input streams in input buffers prior to iteratively assigning each of the plurality of tagged input segments to any one of the plurality of processing engines.

7. The method of claim 6, wherein appending an identity tag to the plurality of input segments is performed prior to storing the plurality of input streams in the input buffers.

8. The method of claim 6, wherein appending an identity tag to the plurality of input segments is performed after storing the plurality of input streams in the input buffers and prior to iteratively assigning each of the plurality of tagged input segments to any one of the plurality of processing engines.

9. The method of claim 1, wherein iteratively assigning each of the plurality of tagged input segments to any one of the plurality of processing engines comprises:
   assigning the tagged input segments within one of the plurality of input streams to the same one of the plurality of processing engines to maintain processing dependency of the tagged input segments within the respective input stream.

10. The method of claim 1, further comprising:
    storing the plurality of tagged input segments in a shared buffer for pre-processing or filtering prior to assigning each of the plurality of tagged input segments to any one of the plurality of processing engines.

11. The method of claim 1, wherein iteratively assigning each of the plurality of tagged input segments to any one of the plurality of processing engines is based on any one of a round-robin order, a random order, an arbitrated order, and a priority order.

12. A multi-engine processing system comprising:
- an input queue handler configured to receive a plurality of input streams, each input stream having a plurality of input segments, the plurality of input segments ordered relative to other input segments within the input stream;
- a tagging module configured to append an identity tag to a plurality of input segments in each input stream to produce a plurality of tagged input segments, the identity tag including information indicating the input stream and the relative order within the input stream of each of the plurality of input segments;
- a scheduler configured to iteratively assign each of the plurality of tagged input segments to any one of a plurality of processing engines based on availability of the processing engines in the relative order of the tagged input segments within the respective input stream,
- each of the plurality of tagged input segments being processed in its respective assigned processing engine to produce a corresponding plurality of tagged output segments;
- a plurality of dedicated output buffers associated with the plurality of processing engines, the plurality of dedicated output buffers configured to store each of the plurality of tagged output segments; and,
- a reordering module configured to reorder the plurality of tagged output segments to produce a plurality of output streams, each output stream having the same relative order of output segments as in the corresponding input stream.

13. The multi-engine processing system of claim 12, wherein the reordering module comprises:
- a sequencer controller configured to repeatedly scan the plurality of dedicated output buffers to identify tagged output segments according to their relative order within each input stream to generate the plurality of output streams.

14. The multi-engine processing system of claim 13, wherein the sequencer controller includes a plurality of sequencers each associated with a dedicated output buffer.

15. The multi-engine processing system of claim 14, further comprising:
- a temporary write out buffer for storing each tagged output as it is identified; and
- multiplexer configured to write out the output stream having the same relative order of output segments as in the corresponding input stream.

16. The multi-engine processing system of claim 15, wherein the tagging module is further configured to sever the appended identity tag from the tagged output segments prior to writing out the output stream having the same relative order of output segments as in the corresponding input stream.

17. The multi-engine processing system of claim 13, wherein the sequence controller includes a plurality of sequence number counters associated with each of the plurality of input streams.

18. The multi-engine processing system of claim 12, wherein the input queue handler comprises:
- input buffers for storing the received plurality of input streams prior to iteratively assigning each of the plurality of tagged input segments to any one of the plurality of processing engines.

19. The multi-engine processing system of claim 12, wherein the input queue handler comprises:
- a shared buffer for storing the plurality of tagged input segments for pre-processing or filtering prior to assigning each of the plurality of tagged input segments to any one of the plurality of processing engines.

20. A non-transitory computer program product having a computer readable program code tangibly embodied therein which, when executed, causes a processor to perform the method of claim 1.

* * * * *